July 19, 1932. C. J. BLAHNIK 1,867,963
AIRCRAFT
Filed June 5, 1931 2 Sheets-Sheet 1
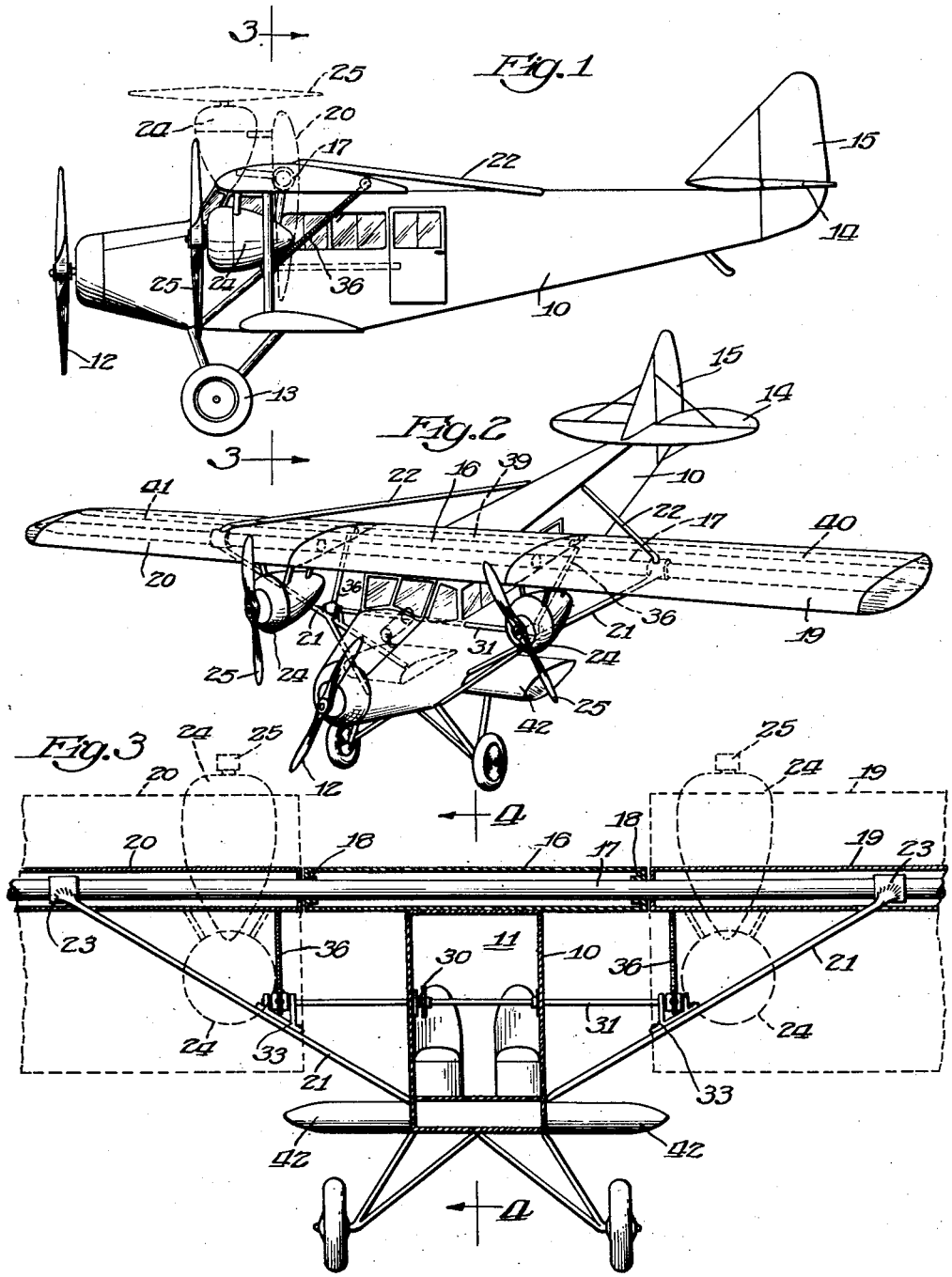
Charles J. Blahnik
INVENTOR:
BY Victor J. Evans & Co.
HIS ATTORNEYS.

July 19, 1932.    C. J. BLAHNIK    1,867,963
AIRCRAFT
Filed June 5, 1931    2 Sheets-Sheet 2
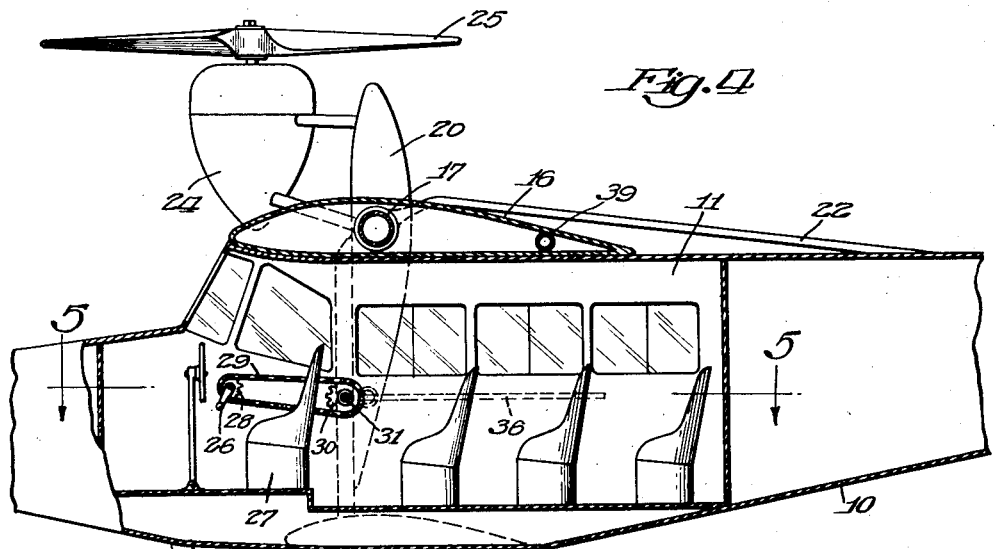
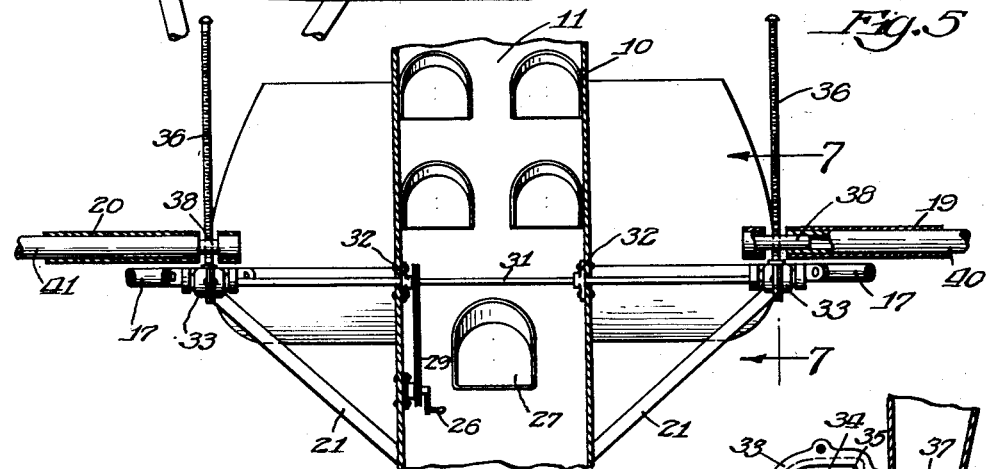
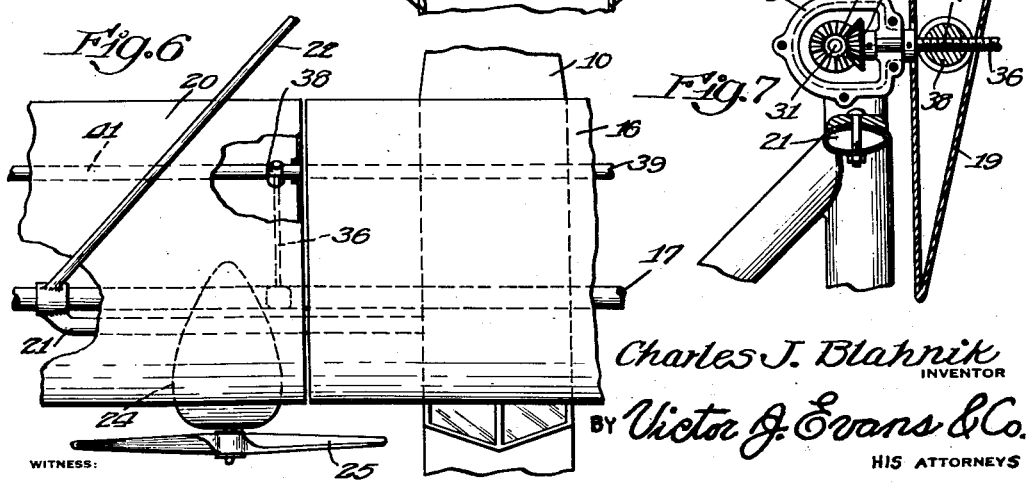
Charles J. Blahnik
INVENTOR
BY Victor J. Evans & Co.
HIS ATTORNEYS Patented July 19, 1932

1,867,963

UNITED STATES PATENT OFFICE

CHARLES J. BLAHNIK, OF WEST ALLIS, WISCONSIN

AIRCRAFT

Application filed June 5, 1931. Serial No. 542,426.

This invention relates to certain novel improvements in aircrafts, and has for its principal object the provision of an improved construction of this character which will be highly efficient in use and economical in manufacture.

The primary object of this invention is to provide an improved tiltable aircraft wing structure for heavier than air machines so that power units carried by the tiltable wings may be employed for both normal flying and as helicopters.

Another object of the invention consists in providing an improved arrangement of tiltable wing panels carrying power units and in providing improved means for tilting these panels in a 90° arc with respect to the fuselage.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a side elevational view of a typical aircraft embodying the invention;

Fig. 2 is a perspective view of the invention as seen in Fig. 1;

Fig. 3 is a transverse sectional view on line 3—3 in Fig. 1;

Fig. 4 is a longitudinal sectional view on line 4—4 in Fig. 3;

Fig. 5 is a sectional view on line 5—5 in Fig. 4;

Fig. 6 is a fragmentary top plan view of the invention; and

Fig. 7 is a sectional view on line 7—7 in Fig. 5.

In the drawings, which illustrate a practical and preferred embodiment of the invention, a typical fuselage is indicated at 10, embodying the cabin 11 and carrying conventional structures such as the main power propeller 12 and undercarriage 13, and controls 14 and 15, none of which forms any part of the invention.

Mounted rigidly on the fuselage 10 is a fixed center wing panel 16 through which extends a tubular main spar 17 rotatably journaled as at 18—18. At the sides of the fuselage 10 tiltable and similar wing panels 19 and 20 are mounted on the spar 17 for movement through an arc of 90°, in a manner to be explained hereinafter. The spar 17 is braced by pairs of struts 21 and 22 anchored at one end to the fuselage in any suitable manner and to collars 23 on the spar 17 at the other end. Suspended from each of the wing panels 19 and 20 in a conventional manner is a power unit 24 operating propellers 25.

The means provided for tilting the similar wing panels 19 and 20 and the power units carried thereby from the normal flying position, shown in full lines in Fig. 1, to dotted line position of Fig. 1, in which position the propellers 25 act as helicopters, will now be described. In this connection an operating crank 26 is provided adjacent the pilot's seat 27 and this crank operates a sprocket 28 over which works a sprocket chain 29 so that motion of crank 26 may be transmitted by chain 29, through sprocket 30 to a rotative shaft 31 that extends transversely through the fuselage 10 and is journaled in suitable bearings 32. The ends of this shaft 31 are journaled in bearing brackets 33 (Fig. 3) fastened to the struts 21 and this shaft 31 carries gears 34 which mesh with gears 35 (Fig. 7) fixed to screws 36 which work in threaded bores 37 in stub shafts 38 each of which has one end journaled in a tubular spar 39 that extends transversely through the center wing panel 16 and the other end journaled in tubular spars 40 and 41 which extend in parallel alignment with each other, and with the spar 39, and through the wing panels 19 and 20.

In normal flying the wing panels will be disposed parallel to the fuselage. However, when it is desired to employ the propellers 25 as helicopters, in taking off and landing, the pilot will turn crank 26 which will rotate sprocket 28, chain 29, sprocket 30, shaft 31, gears 34 and 35, which will cause screws 36 to turn in the bores 37 of the turnable stub shafts 38 and thus the wing panels 19 and 20 and the propellers 25 and their power units 24 will be tilted from the full line position of Fig. 1 to dotted line position wherein it will be noted that the wing panels 19 and 20 will then be disposed at rightangles to the fuselage 10 and parallel to the slip line of the air stream of propellers 25 when these propellers are rotated in dotted line position of Fig. 1 and full line position of Fig. 4. The propellers 25 will therefore act as helicopters to facilitate the landing and taking off of the plane and the wing panels 19 and 20, being then parallel to the slip line of the air stream of the propellers, offer a minimum resistance to the lifting effect of the propellers 25. Obviously, by rotating crank 26 in an opposite direction the wing panels 19 and 20 and propellers 25 and their power units 24 may be tilted back into normal flying position to cooperate with propeller 12. Auxiliary wings 42 may be mounted in low wing position on the fuselage, if desired, to facilitate normal flying.

The invention, therefore, as described, provides an improved tiltable aircraft wing structure and means for moving the tiltable wings from normal flying position into a position in which the power units carried by the tiltable wings will act as helicopters.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

An air craft wing structure comprising a center panel fixed to the fuselage, tiltable wing panels at opposite sides of said center panel carrying propellers and power units therefor, and means for tilting said tiltable wing panels and propellers through an arc of 90° with respect to the fuselage, said means including a shaft rotatably mounted in the fuselage, screws, stub shafts rotative in said tiltable wings and provided with threaded bores to receive said screws, means for transmitting rotative movement of said shaft to said screws, and means for rotating said shaft from the pilot's compartment of the plane.

In testimony whereof I affix my signature.

CHARLES J. BLAHNIK.